April 28, 1953     J. G. LIVINGSTONE     2,636,629
POURING ATTACHMENT AND ADAPTER THEREFOR
Filed Nov. 29, 1947     2 SHEETS—SHEET 1

INVENTOR:
JAY G. LIVINGSTONE
BY
ATTORNEY.

April 28, 1953     J. G. LIVINGSTONE     2,636,629
POURING ATTACHMENT AND ADAPTER THEREFOR Filed Nov. 29, 1947     2 SHEETS—SHEET 2

INVENTOR.
JAY G. LIVINGSTONE
BY

Patented Apr. 28, 1953

2,636,629

UNITED STATES PATENT OFFICE 2,636,629

POURING ATTACHMENT AND ADAPTER THEREFOR

Jay Gould Livingstone, Akron, Ohio

Application November 29, 1947, Serial No. 788,917

4 Claims. (Cl. 215—73)

This invention relates to a one-piece pouring attachment and adapter such as might be used in pouring milk, etc. from a milk bottle or the like. The invention includes the pouring attachment and adapters of different design and combinations thereof. The pouring attachment may be designed to fit more than one bottle, and in combination with an adapter it may be used on bottles of still different sizes.

Although one may think of milk bottles as being of a standard size, the fact is that they differ in details. It is customary for the quart, pint and half-pint bottles used by any one company to have the same size opening and to receive the same size cap so that all can be filled and capped on the same equipment. However, the equipment used by different companies and in different localities varies, and in many cities bottles with openings of two different sizes are used. Taking the United States as a whole, most milk bottles are adapted to be closed with a cap of one of four different diameters, viz., 48, 51, 54 or 56 millimeters. Although these diameters vary only a millimeter or two, caps or pouring attachments designed to fit bottles with an opening of one size cannot be used with bottles having an opening of a different size. In most cities most of the bottles have one of the two smaller sized openings, so pouring attachments adapted to fit openings of both 48 and 51 millimeters will fit most milk bottles.

In addition to the smaller bottles, gallon milk bottles are popular in many cities and these have a much larger opening. In most milk bottles, just above the neck or narrowest portion of the bottle, there is a ledge or seat for the cap or pouring attachment. In other milk bottles there is no such seat. The neck of such bottles may be of substantially uniform diameter throughout, widening almost imperceptibly at the top. In such bottles the cap or pouring attachment is pressed into this opening.

The pouring attachments of this invention include those provided with flanges of different sizes to fit into bottle openings of different sizes. The adapters are provided with flanges of still other diameters to fit other bottle openings. Thus a single pouring attachment, with or without an adapter, will fit bottles of a variety of different sizes.

The invention will be further described in connection with the accompanying drawings.

In various of the views the same pouring attachment is shown. The flanges are not seated in the bottles as they will be in practice in bottles of the type illustrated in Figs. 1–13, but are lifted somewhat to better illustrate the invention.

The pouring attachment A may be molded of plastic, or formed of metal or any suitable material. The spout 1 may be of any suitable design. The flanges 5 and 6 at the base 7 of the attachment are wafer-like and thin enough to be so flexible as to permit their being pushed into place in a bottle opening, but must be thick enough so that this operation can be repeated many times without injuring the flange. Likewise the flanges are stiff enough to alone support the pouring outlet in an opening. They are the sole means for sealing the pouring outlet in the opening. A somewhat resilient material such as polyethylene has proved very satisfactory in a glass bottle. An unyielding material such as glass or metal could be used satisfactorily in a bottle of polyethylene or other plastic or paper bottles. The fit is a friction fit like that provided by the ordinary paper milk bottle cap.

Figure 1:
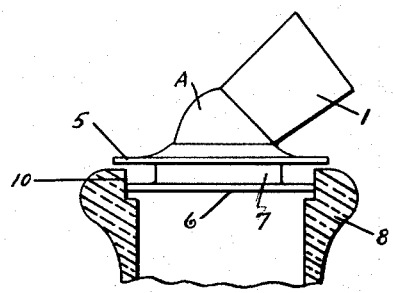
Fig. 1 is an elevation of a pouring attachment with flanges of two different sizes with the smaller flange fit into a bottle of one size.
Figure 2:
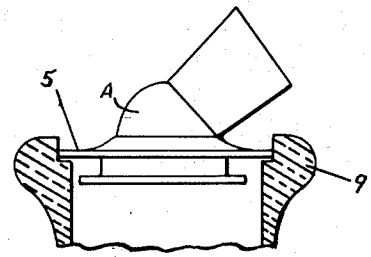
Fig. 2 is an elevation of the same pouring attachment with the other flange fit into a bottle with a larger opening.

Figs. 1 and 2 show the pouring attachment placed in bottles 8 and 9, the opening of which are of different diameters. The opening of bottle 8 is smaller than that of the bottle 9. The two figures illustrate how a single pouring attachment provided with two or more flanges of different diameter may be used in openings of different diameter. It is necessary that the bottom flange be the smaller of the two. If three or more flanges are used to fit bottles of as many different sizes they must be arranged so that the flanges become progressively smaller from the top down. Means is provided for conducting liquid through the pouring outlet and its largest cross-section from one end thereof to the other is smaller in all directions than the smallest dimension of the smaller flange. With bottles of the type shown in these figures the important diameter is not the inside diameter at the neck of the bottle, but the inside diameter of the depression 10 (Fig. 1) in the top of the bottle which holds the flange or bottle cap.

Figure 3:
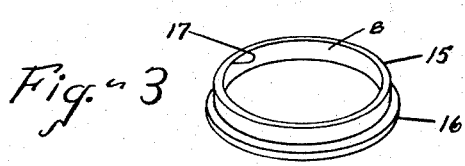
Figs. 3 and 4 are views in perspective of the same adapter ring, the ring in one figure being shown in the reverse position from the position shown in the other view.
Figure 4:
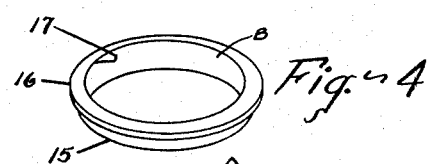

The adapter ring B shown in Figs. 3 and 4 is formed with two different outside diameters. The diameter at 15 is somewhat smaller than the diameter at 16. The inside diameter 17 is the same at both ends so as to form a snug fit with the circumference of the flange 6 at the bottom of the pouring attachment, and generally the inside diameter will be uniform throughout to permit unobstructed flow of the liquid. The outside surface of the adapter ring need not be stepped, but may taper gradually from one diameter to the other. If flanges of three or more different diameters are provided, the flanges may gradually decrease in diameter from one end of the adapter to the other, or the smallest flanges may be located at the top and bottom of the adapter, with those of intermediate size between them. In any event the difference between the diameters of adjacent flanges must be sufficient to permit any lower unneeded flange of smaller diameter to fit inside the neck of the bottle.

Figure 5:
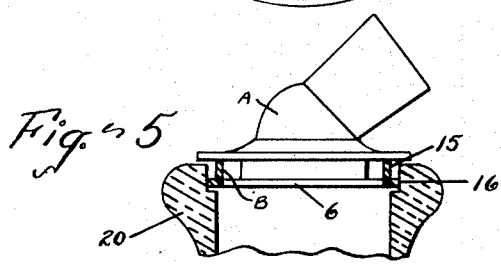
Fig. 5 shows the pouring attachment and the adapter ring used as shown in Fig. 3, in a bottle with an opening of one size.
Figure 6:
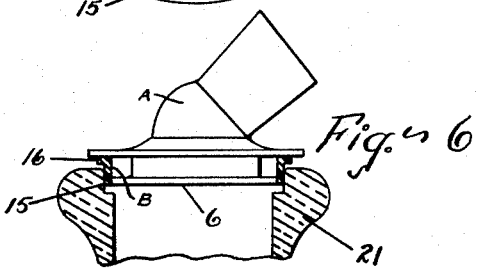
Fig. 6 shows the pouring attachment with an adapter ring used as shown in Fig. 4, in a bottle with a smaller opening.

Figs. 3 and 4 show the same adapter ring B, the only difference between the two figures being that in Fig. 3 the larger outside diameter 16 is at the bottom of the ring, whereas in Fig. 4 the larger diameter 16 is at the top of the ring and the smaller outside diameter 15 is at the bottom of the ring. When placed over the flange 6 at the bottom of the pouring attachment, with the upper edge flush against the under surface of the flange 5, in the position shown in Fig. 3 the larger outside diameter 16 is the effective diameter and Fig. 5 shows how this fits into the top of a bottle 20 with an opening of the required diameter. Fig. 6 shows how the same adapter ring, in the reverse position, fits into the opening of the bottle 21 which has an outlet of somewhat smaller diameter. Thus, the four bottles shown in Figs. 1, 2, 5 and 6 have openings of different diameters, but with the aid of the adapter ring the pouring attachment can be used with each.

Figure 8:
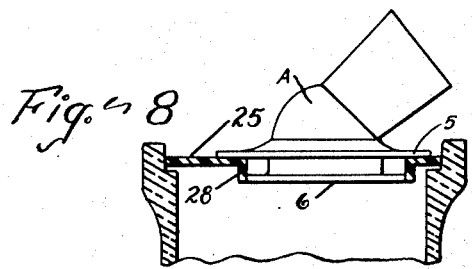
Fig. 8 shows the pouring attachment with the adapter plate in a large-mouthed bottle.
Figure 7:
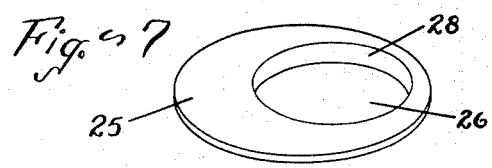
Fig. 7 shows an adapter plate to be used with a large-mouthed bottle.

The plate adapter 25 shown in Fig. 7 likewise fits over the flange 6 of the pouring attachment and provides for use of the same pouring attachment on a wider-mouthed bottle such as a gallon milk bottle. The opening 26 is of just the diameter to fit the flange 6 at the bottom of the pouring attachment. There is a flange 28 around the opening which constitutes a cylindrical wall, usually of greater thickness than the balance of the adapter. The upper surface of the plate 25 can be brought into face-to-face contact with the under surface of the flange 5. When the pouring attachment is to be used the adapter plate fits into the opening of the bottle, as shown in Fig. 8.

Figure 9:
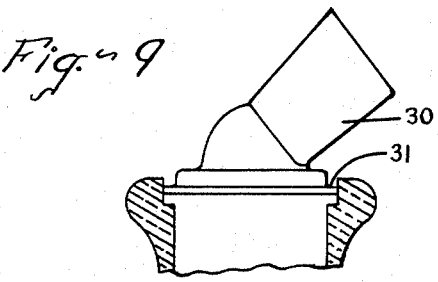
Fig. 9 shows a different pouring attachment in a bottle.

It is not essential that the pouring attachment have more than one flange. In fact, it need have no flange. However, since a high percentage of the milk bottles have the smallest size opening (48 millimeters) it is advisable to provide a flange of this size on the pouring attachment. Fig. 9 shows a pouring attachment 30 with but a single flange 31.

Figure 12:
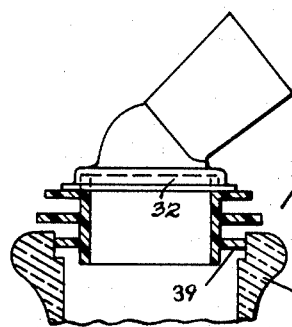
Figs. 11–13 show different combinations of the pouring attachment and adapter in bottles with openings of different sizes.
Figure 11:
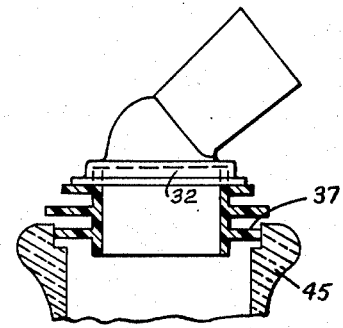
Figure 10:
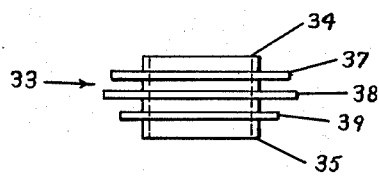
Fig. 10 shows a cylindrical adapter.
Figure 13:
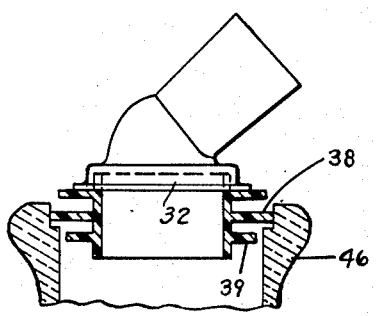

Fig. 10 shows a cylindrical adapter 33 adapted to fit inside the countersunk bottom of the pouring attachment, and with flanges of different sizes to fit bottles of different sizes. As shown in Figs. 11–13 the underside of the pouring attachment 30 (shown in Figs. 9, 11, 12 and 13) is cylindrically countersunk at 32 to receive either end 34 or 35 of the adapter. Both ends of the adapter have the same outside diameter, and the inside diameter of the countersunk portion is preferably uniform to permit unobstructed flow of the milk, etc. The depth of the countersunk portion is preferably just equal to, or not greater than, the distance from an end of the ring to the nearest of the three flanges 37, 38 and 39. Thus, with the under flat surface of the flange 31 in face-to-face contact with the upper or lower flange 37 or 39, the assembly has considerable stability.

Figs. 11–13 show the pouring attachment and adapter in bottles with outlets of different size. Thus, if the diameter of the flange 31 is 48 millimeters, the diameters of the flanges 37, 38 and 39 may advantageously be 54, 56 and 51 millimeters, respectively. Thus they fit into the bottles 45, 46 and 47, respectively. This is illustrated in Figs. 11–13.

The flange of largest diameter need not be in the middle. However, this is a convenient arrangement. In using the adapter in a bottle of the largest size, it may be used as shown in Fig. 13, or the adapter may be reversed with the flange 39 nearest the pouring attachment.

Figure 14:
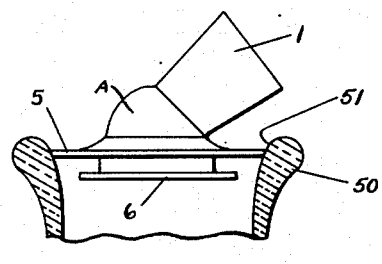
Fig. 14 shows a pouring attachment and adapter in a different type of bottle.

Fig. 14 illustrates the type of bottle 50 in which there is no offset or seat for the cap or pouring attachment. The mouth 51 is rounded inwardly and the inside diameter of the mouth may decrease over just a short distance or over a greater distance. The pouring attachment 1 which is illustrated is the same as shown in Figs. 1–8. The flange 5 makes a tight friction fit in the mouth of the bottle. The smaller flange 6 will similarly fit in smaller-necked bottles. Adapters may be used with this pouring attachment or other pouring attachments to fit other bottles.

In each case the fit of the adapter into the opening of the bottle must be snug so that the pouring attachment is held by the bottle with sufficient firmness to permit milk, etc. to be poured from the bottle with the weight of milk against the bottom of the adapter. Polyethylene has been found a very suitable material for making the various adapters and the flanges on the pouring attachment. It is sold under various trade-names such as Polythene, etc. The whole pouring attachment may be made of such material to advantage. It is flexible and sufficiently yielding to permit a tight friction fit to be made between it and the pouring attachment of a bottle of any size. Other flexible materials such as the vinyl compounds sold as Geon, etc., are usable.

The invention is defined in the claims.

What I claim is:

1. In combination with a pouring attachment with two spaced parallel flanges of different diameters near the base thereof, with the flange of smaller diameter nearer the base, a cylindrical adapter of uniform internal diameter the same as said flange of smaller diameter fitted over said latter flange and snug against the under surface of the flange of larger diameter, the adapter being bounded by a wall of different outside diameters.

2. In combination with a pouring attachment with two spaced parallel flanges of different diameters near the base thereof, with the flange of smaller diameter nearer the base, a cylindrical adapter of uniform internal diameter the same as said flange of smaller diameter fitted over said latter flange and snug against the under side of the flange of larger diameter, the height of the adapter being substantially equal to the distance between the bottom surfaces of said two flanges, the outer surface of the cylinder being formed of surfaces of different outside diameters.

3. In combination with a pouring attachment with two spaced parallel flanges of different diameters near the base thereof, with the flange of smaller diameter near the base, a circular plate adapter with a non-concentric opening in it and a flange around the opening of the same internal diameter as the opening, the distance from one end of the flanged opening to the other being substantially the same as the distance between the bottom surfaces of said two flanges.

4. In combination, a pouring attachment body comprising a cylindrical wall portion and a second cylindrical wall portion projecting from the bottom of said first portion and of smaller diameter, a circular enlargement on the outer surface of the second wall adjacent the free end thereof to receive an adapter, and a generally cylindrical adapter of uniform internal diameter the same as the diameter of the enlargement, fitted over the enlargement and against the portion of larger cross section, and removable therefrom, the adapter being bounded by a wall of at least two different outside diameters so as to fit openings of different sizes.

JAY GOULD LIVINGSTONE.

References Cited in the file of this patent

UNITED STATES PATENTS

| Number | Name | Date |
|---|---|---|
| 650,615 | Salomon | May 29, 1900 |
| 701,101 | Stutz | May 27, 1902 |
| 893,469 | Essmuller | July 14, 1908 |
| 1,577,539 | Polk | Mar. 23, 1926 |
| 2,101,324 | Warner | Dec. 7, 1937 |
| 2,115,035 | Morgan | Apr. 26, 1938 |
| 2,197,766 | Mueller | Apr. 23, 1940 |
| 2,388,169 | McAlevy | Oct. 30, 1945 |

FOREIGN PATENTS

| Number | Country | Date |
|---|---|---|
| 705,992 | France | June 17, 1931 |